US008849209B2

(12) United States Patent
Nieto et al.

(10) Patent No.: US 8,849,209 B2
(45) Date of Patent: Sep. 30, 2014

(54) COMMUNICATIONS DEVICE WITH SELECTIVE SPECTRUM ASSIGNMENT AND RELATED METHODS

(75) Inventors: John Wesley Nieto, Rochester, NY (US); William Nelson Furman, Fairport, NY (US); Eric Norman Koski, Fairport, NY (US)

(73) Assignee: Harris Corporation, Melbourne, FL (US)

(*) Notice: Subject to any disclaimer, the term of this patent is extended or adjusted under 35 U.S.C. 154(b) by 166 days.

(21) Appl. No.: 13/429,665

(22) Filed: Mar. 26, 2012

(65) Prior Publication Data

US 2013/0252558 A1 Sep. 26, 2013

(51) Int. Cl.
*H04B 1/00* (2006.01)

(52) U.S. Cl.
USPC ............. 455/63.1; 455/39; 455/63.3; 455/65; 455/67.13; 455/69

(58) Field of Classification Search
USPC .......................... 455/63.1, 63.3, 65, 67.13, 69
See application file for complete search history.

(56) References Cited

U.S. PATENT DOCUMENTS

| 5,734,963 | A | * | 3/1998 | Fitzgerald et al. | 340/7.25 |
| 5,825,814 | A | * | 10/1998 | Detwiler et al. | 375/219 |
| 7,027,418 | B2 | * | 4/2006 | Gan et al. | 370/329 |
| 7,570,614 | B2 | | 8/2009 | Treister et al. | |
| 7,903,608 | B2 | * | 3/2011 | Gan et al. | 370/329 |

OTHER PUBLICATIONS

Furman et al, "Design and System Implications of a Family of Wideband HF Data Waveforms," TRO-MP-IST-092, Sep. 29, 2010, pp. 118-1 to 118-28.

\* cited by examiner

*Primary Examiner* — Edward Urban
*Assistant Examiner* — Max Mathew
(74) *Attorney, Agent, or Firm* — Allen, Dyer, Doppelt, Milbrath & Gilchrist, P.A.

(57) ABSTRACT

A communications device may include a wireless radio frequency (RF) transceiver, and a controller coupled to the wireless RF transceiver. The controller may be configured to determine received signal characteristics and perform a spectral estimation operation associated with a frequency spectrum on the received signal characteristics, determine a channel selection method characteristic associated with a channel in the frequency spectrum including channels, generate statistical values for each channel based upon the received signal characteristics, and select a portion of the frequency spectrum for a signal to be transmitted by the wireless RF transceiver based upon the spectral estimation operation, the statistical values, and the channel selection method characteristic.

33 Claims, 4 Drawing Sheets

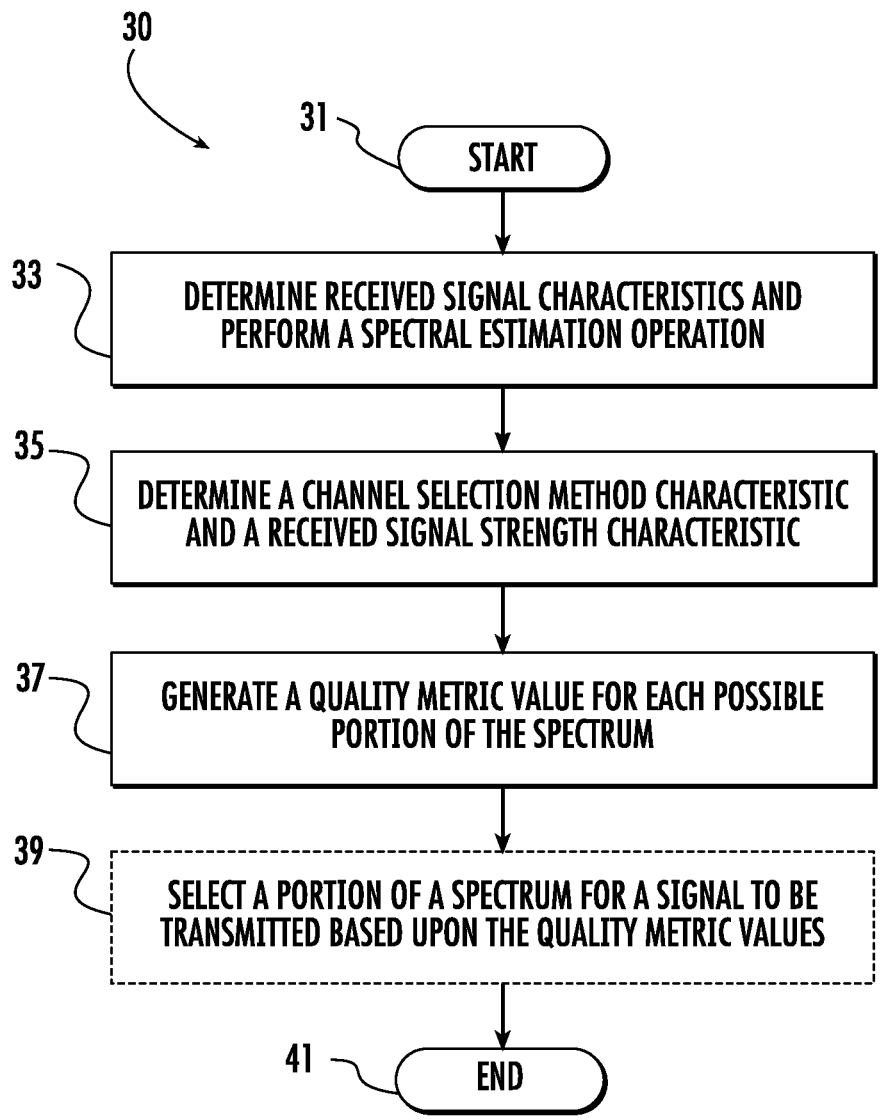

COMMUNICATIONS DEVICE WITH SELECTIVE SPECTRUM ASSIGNMENT AND RELATED METHODS

FIELD OF THE INVENTION

The present invention relates to the field of communications, and, more particularly, to radio frequency (RF) wireless communications and related methods.

BACKGROUND OF THE INVENTION

Wireless communications devices are an integral part of society and permeate daily life. The typical wireless communications device includes an antenna, and a transceiver coupled to the antenna. The transceiver and the antenna cooperate to transmit and receive communications signals. A typical RF transceiver includes a power amplifier for amplifying low power signals for transmission via the antenna.

One example of a wireless communications device is a high frequency (HF) wireless communications device. The typical HF wireless communications device covers the frequency range of 2-30 MHz and provides several benefits. For example, the HF wireless communications device offers potential worldwide communication capabilities with little to no infrastructure. Indeed, HF communication is popular with many amateur (HAM) radio operators, permitting one operator to readily contact another operator on another continent. The long range of HF wireless communication systems is the result of the desirable propagation characteristics of HF waves, resulting from their refraction by the Earth's ionosphere. However, long range HF communication can be affected by varying ionospheric conditions. Conditions that may affect HF communications include, for example, sunlight/darkness at site of transmission and reception, season, solar sunspot cycle, solar activity, and polar aurora. In particular, these conditions can cause only some HF frequencies to be usable on a particular link; which frequencies are usable at any given time may be difficult to predict. Accordingly, the user may be forced to manually cycle through several frequencies to find a channel suitable for transmission.

An approach to this drawback in HF communication systems is an automatic link establishment (ALE) method. The ALE method typically includes automated procedures for evaluating the propagation characteristics of multiple frequencies and selecting a suitable frequency on which to establish a link among two or more stations desiring to communicate. Helpfully, the user of the HF communication system need not manually scan and evaluate the available frequencies. When a communication is initiated, the transmitter device selects the best available frequency for the desired transmission path.

HF communication systems have typically utilized 3,000 Hertz (3 kHz) of bandwidth for a given channel. Several data signaling standards have been developed for these 3 kHz channels. These standards typically support up to 9,600 bits per second (bps) data communications over 3 kHz HF channel links. In addition, several ALE standards have been developed to support the 3 kHz bandwidth channel.

As the demand for higher data rates continues to grow, new waveforms/standards are being developed, which expand the utilized bandwidth from 3 kHz up to 24 kHz in 3 kHz increments, and the data rate capability from 9,600 bps to 76,800 bps for HF skywave links and 120,000 bps for benign HF surface wave and skywave links. These HF waveforms are referred to as wideband HF waveforms.

Notwithstanding the benefits of the wideband HF wireless communications device, the typical user of such HF wireless communications devices may experience difficulty in establishing a communications link due to propagation and interference. In particular, if the wideband spectrum assigned to a user includes a number of interferers, the user may spend a significant amount of time to determine the usable parts of the wideband spectrum.

One approach to frequency selection is disclosed in U.S. Pat. No. 5,734,963 to Fitzgerald et al. This narrowband, i.e. a typical 3 kHz bandwidth, HF approach includes an HF communication system comprising a plurality of radio base stations (RBSs) and field units. The field units use detected noise levels, detected interferers, and known fixed transmitters to determine the appropriate frequency for transmission. The RBSs maintain databases for the frequency spectrum, which include received signal strength characteristics.

SUMMARY OF THE INVENTION

In view of the foregoing background, it is therefore an object of the present invention to provide a communications device that may provide wideband operation in an HF frequency range.

This and other objects, features, and advantages in accordance with the present invention are provided by a communications device that includes a wireless RF transceiver, and a controller coupled to the wireless RF transceiver. The controller is configured to determine a plurality of received signal characteristics and perform a spectral estimation operation associated with a frequency spectrum thereon, determine a channel selection method characteristic, such as a ALE characteristic, associated with a channel in the frequency spectrum comprising a plurality of channels, generate a plurality of statistical values for each channel based upon the plurality of received signal characteristics, and select a portion of the frequency spectrum for a signal to be transmitted by the wireless RF transceiver based upon the spectral estimation operation, the plurality of statistical values, and the channel selection method characteristic. Advantageously, the communications device may selectively assign usable spectrum portions efficiently.

More specifically, the controller may be configured to generate a quality metric value for each possible portion of the spectrum for the signal to be transmitted, and the controller may select the portion of the spectrum further based upon the quality metric values. The controller may also be configured to select the portion of the spectrum further based upon at least one received signal strength characteristic.

In certain embodiments, the spectrum comprises a plurality of channels, and the controller may be configured to generate a plurality of statistical values for each channel based upon the plurality of received signal characteristics.

The controller may be configured to select the portion of the spectrum further based upon the plurality of statistical values, and to generate a signal-to-noise value profile for each channel based upon the plurality of statistical values. For example, the controller may be configured to perform spectrum compensation on results of the spectral estimation operation. The plurality of received signal characteristics may comprise a plurality of received sample values. The communications device may be configured to operate in the HF range and with a channel width greater than 3 kHz. The controller may be configured to select the portion of the spectrum based upon a cognitive radio process.

Another aspect is directed to a method of operating a communications device including a wireless RF transceiver, and a controller coupled thereto. The method includes using the controller to determine a plurality of received signal characteristics and perform a spectral estimation operation thereon, the frequency spectrum comprising a plurality of channels, using the controller to generate a plurality of statistical values for each channel based upon the plurality of received signal characteristics, using the controller to determine a channel selection method characteristic associated with a channel in the frequency spectrum, and using the controller to select a portion of the frequency spectrum for a signal to be transmitted by the wireless RF transceiver of the communications device based upon the spectral estimation operation, the plurality of statistical values, and the channel selection method characteristic.

BRIEF DESCRIPTION OF THE DRAWINGS

FIG. 2 is a flowchart illustrating a method of operation for a communications device in the RF communication system of FIG. 1.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
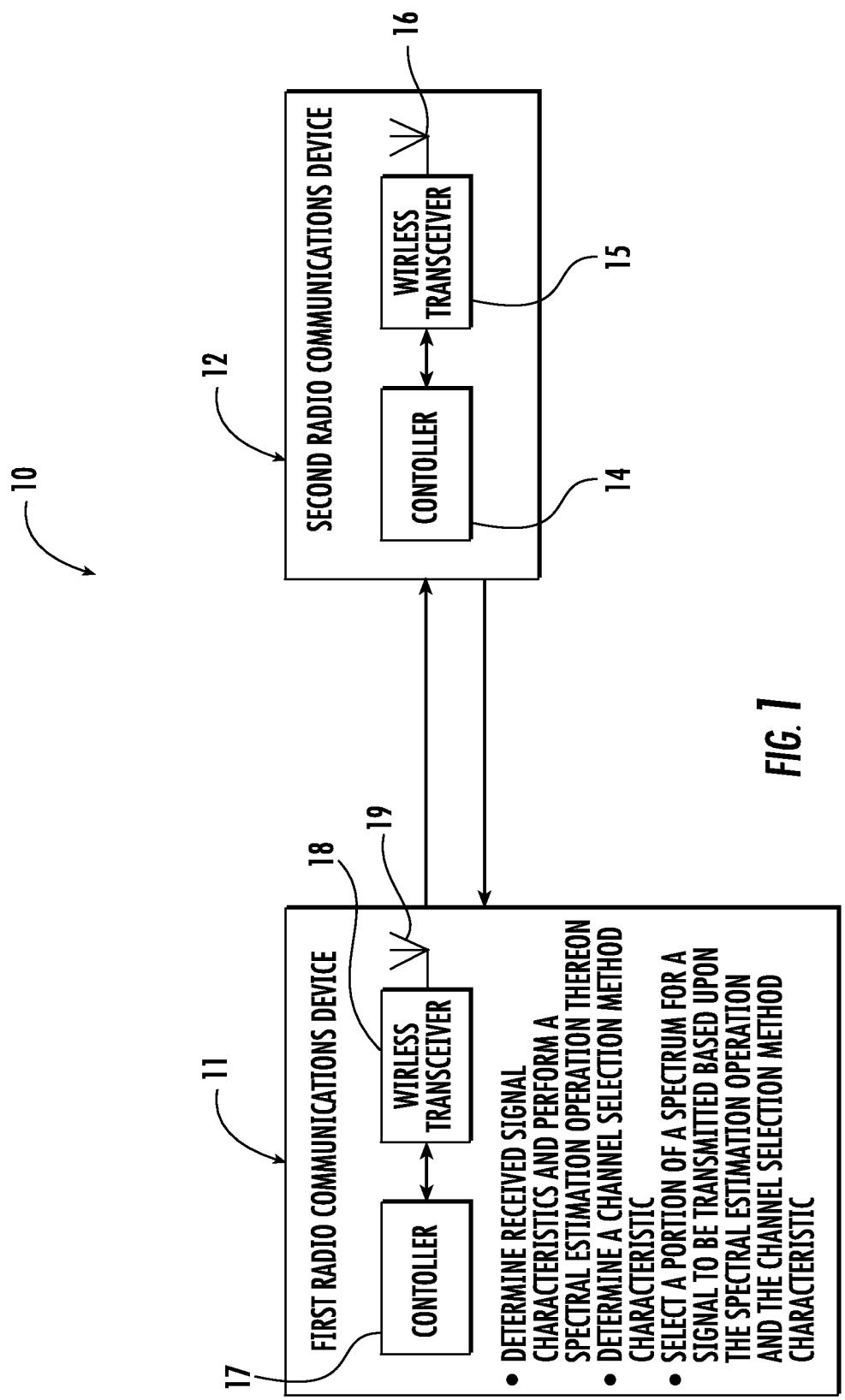
FIG. 1 is a schematic block diagram of the RF communications system, according to the present invention.

Referring initially to FIGS. 1-2, an RF communication system 10 according to the present invention is now described. The RF communication system 10 illustratively includes a first communications device 11, and a second communications device 12 communicating therewith. The first communications device 11 includes an antenna 19, a wireless RF transceiver 18 coupled to the antenna, and a controller 17 coupled to the wireless RF transceiver. The second communications device 12 includes an antenna 16, a wireless RF transceiver 15 coupled to the antenna, and a controller 14 coupled to the wireless RF transceiver.

The first and second communications devices 11, 12 may operate at 1.5 to 30 MHz, i.e. an HF frequency range, but may operate alternatively or additionally in other frequency ranges, such as the very high frequency range (VHF). Advantageously, the RF communication system 10 operates with wideband bandwidth, such as a channel width greater than 3 kHz. Nevertheless, the RF communication system 10 may use an ALE communication protocol, for example, US MIL-STD-188-141C (2nd Generation ALE) or STANAG 4538 (3rd Generation ALE). In particular, the RE communication system 10 may use the ALE to initiate communication between the first and second communications devices 11-12, such as handshake protocols etc., and to ensure that an actual connection is made, i.e. that propagation is successful. As will be appreciated by those skilled in the art, the communications devices 11, 12 may be based upon any of a number of different wireless communications devices, such as, for example, the Falcon® II AN/PRC-150(C) manpack radio, as available from the Harris Corporation of Melbourne, Fla., the assignee of the present application.

In FIG. 2, a flowchart 30 illustrates a method of operation of the RF communication system 10, which begins at Block 31. The controller 17 of the first communications device 11 is configured to determine a plurality of received signal characteristics. For example, the plurality of received signal characteristics may comprise a plurality of received sample values. In some embodiments, the received signal characteristics may be wideband, while in others, they may be narrowband. The controller 17 is configured to perform a spectral estimation operation associated with a frequency spectrum thereon, for example, averaging many received samples via a windowing operation and a fast Fourier transform (FFT) operation or a window and FFT operation (Block 33).

The controller 17 is also configured to determine a channel selection characteristic, for example, an ALE characteristic, associated with a channel in the frequency spectrum. For example, the ALE characteristic may comprise an ALE state characteristic, such as whether the first communications device 11 is in an ongoing communications mode, a handshake mode, a passively scanning mode, a dwelling mode, a transmitting or receiving ALE signal mode etc. Yet further, the controller 17 is configured to perform spectrum compensation on results of the spectral estimation operation. As will be appreciated by those skilled in the art, the spectrum compensation operation will reduce the distortion effects of components of the communications device 11, such as filters. The controller 17 is configured to determine a received signal strength characteristic, such as a received signal strength indicator (RSSI) (Block 35).

In certain embodiments, the controller 17 organizes the spectrum used by the RF communication system 10 into a plurality of channels. Based upon the received signal strength characteristic, the ALE characteristic, and the plurality of received signal characteristics, the controller 17 is configured to generate a plurality of statistical values for each channel (where a channel can be defined to be the smallest resolution of spectrum estimation operation (defined as a frequency bin) or a group of bins). For example, the controller 17 maintains a minimum value, a maximum value, and an average statistical value for each spectral estimation bin or group of bins. The controller 17 maintains two versions the plurality of statistical values: one with active ALE communication; and one without active ALE communication.

More specifically, the controller 17 is configured to generate a quality metric value for each possible portion of the spectrum, i.e. frequency alignment and bandwidth, for the signal to be transmitted (Block 37). The quality metric values are based upon the aforementioned statistical values generated by the controller 17. Moreover, the controller 17 creates spectrum profiles for a signal to be transmitted, such as a signal-to-noise value profile for each channel based upon the plurality of statistical values. Furthermore, the controller 17 uses the ALE characteristic to compensate for any self-interference that may occur if the associated ALE subsystem is currently operating. The controller 17 may be configured to determine the plurality of received signal characteristics and the channel selection method characteristic, and perform the spectrum estimation method simultaneously.

The controller 17 is configured to select a portion of the frequency spectrum for the signal to be transmitted by the wireless RF transceiver 18 based upon the quality metric values and the spectrum profiles (Blocks 39 & 41). In advantageous embodiments, the controller 17 operates as a cognitive radio controller based upon this spectrum data to thereby increase bandwidth and reduce transmission error. The controller 17 may provide a plurality of possible signal alignments, which may be ranked based upon the respective quality metrics.

Figure 4:
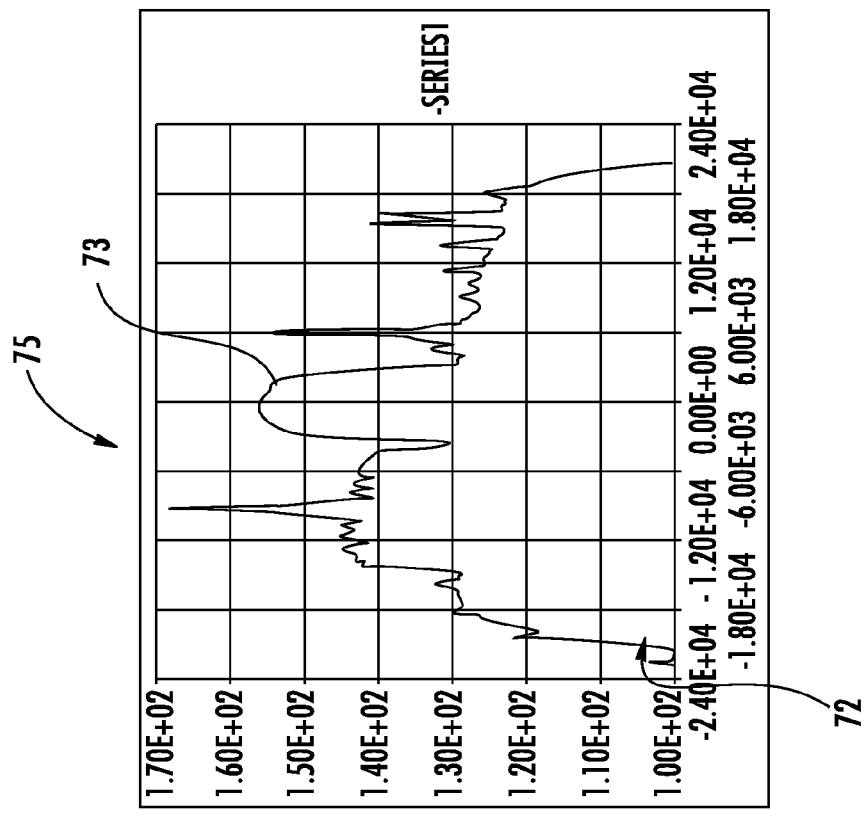
FIGS. 3-4 are graphs of the spectrum during operation of the RF communication system of FIG. 1.
Figure 3:
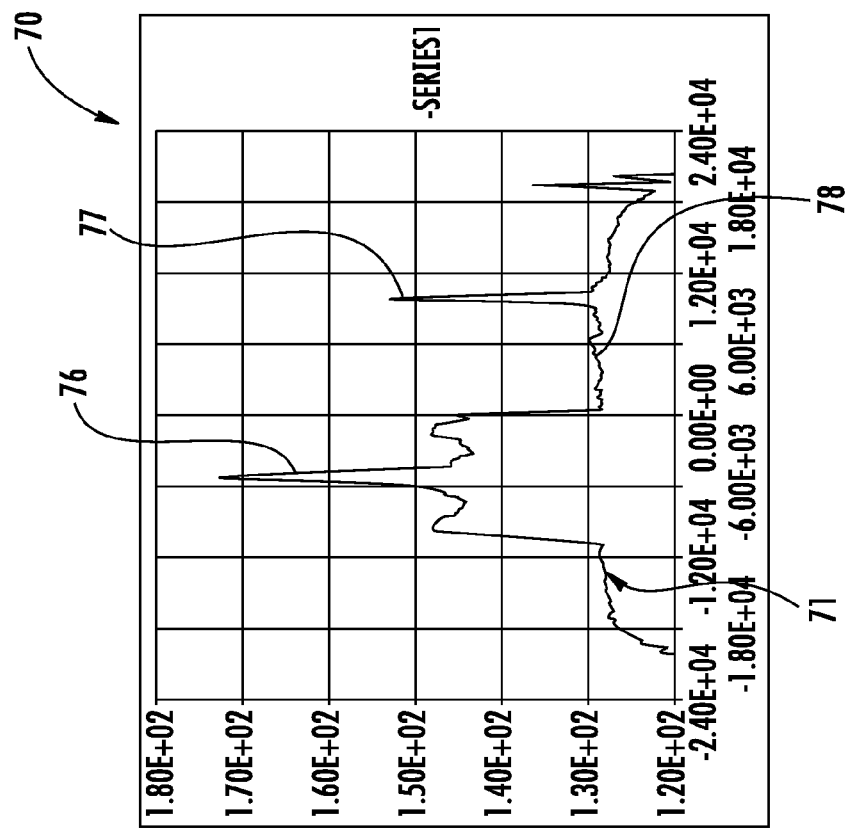

Referring now additionally to FIG. 3-4, graphs 70, 75 illustrate the operation of the controller 17 selecting an appropriate portion of the spectrum for the signal to be transmitted. Curve 71 illustrates the spectrum used by the RF communication system 10, including potential interferer peaks 76-77. As discussed above, the controller 17 performs an analysis of the spectrum (i.e. based on spectral estimation operation) to produce quality metrics for each potential channel and a spectrum profile. Advantageously, as shown in curve 72, the controller 17 selects the spectral portion for transmission producing the spectral portion 73 (FIG. 4) in a relatively flat portion 78 (FIG. 3) of the spectrum, thereby increasing transmission quality.

Figure 5:
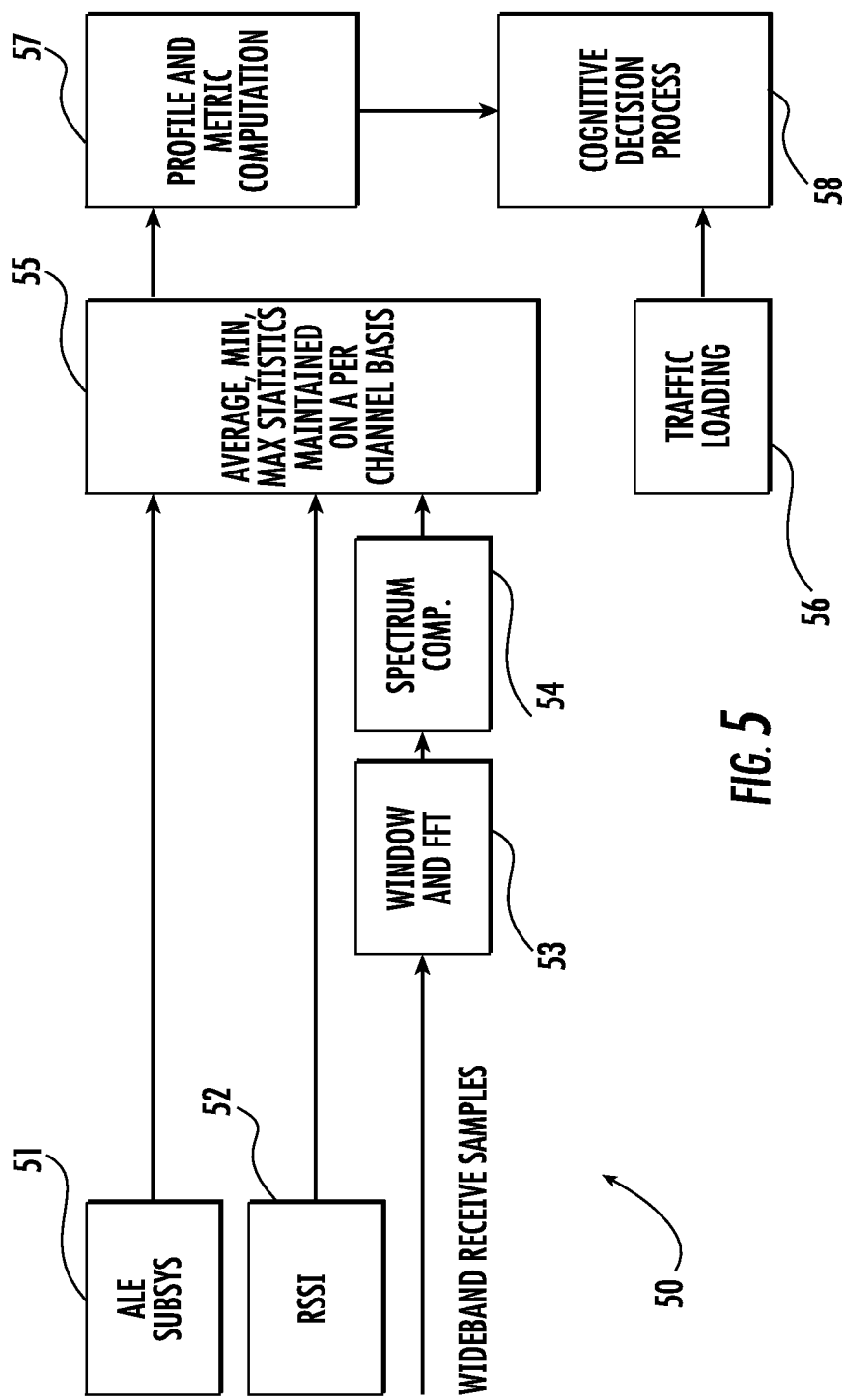
FIG. 5 is a schematic block diagram of another embodiment of the RF communication system, according to the present invention.

Referring now to FIG. 5, an exemplary implementation of a communications controller 50 is now described. The communications controller 50 includes an ALE subsystem module 51, a RSSI module 52, and a statistics module 55 coupled downstream from the ALE subsystem module and the RSSI module. The communications controller 50 also includes a windowing and FFT module 53 configured to receive a plurality of wideband receive samples, and a spectrum compensation module 54 coupled to the FFT module for performing spectrum compensation, as described above. The output of the spectrum compensation module 54 is also fed into the statistics module 55. The communications controller 50 includes a profile and metric module 57 receiving the statistical values from the statistical module 55, a traffic loading module 56 for providing traffic characteristics, such a load, duty cycle, etc., and a cognitive decision module 58 selecting the proper portion of the spectrum for the signal to be transmitted based upon the traffic conditions and throughput requirements of all nodes in the HF network and the profile and metric results.

In the exemplary implementation embodiment of the communications controller 50, the controller is configured to
a. determine a plurality of received signal characteristics for a signal or signals received in each of one or more channels;
b. perform a spectral estimation operation using the received signal characteristics of each of one or more such channels, so as to estimate the spectrum of the signal received in each such channel;
c. determine a plurality of metrics representing the power of noise and interference received in each of a plurality of portions of one or more channels on which spectral estimation has been performed, using the spectral estimate(s) in conjunction with at least one other received signal characteristic such as received signal strength;
d. determine at least one statistical characteristic of the plurality of noise and interference power metrics for the portions of at least one channel (from c.), such as mean, minimum, maximum, variance, etc.;
e. determine a plurality of received signal strength measurements of a received signal transmitted by a known remote station (associated with a desired transmitting station) within each of one or more of the channels;
f. determine at least one statistical characteristic of the plurality of received signal strength measurements as in e., for each of one or more of the channels;
g. determine a plurality of quality metrics for subchannels of at least one channel, using at least one of the statistical characteristics of the plurality of noise and interference power metrics in d., and the statistical characteristics of the plurality of received signal strength measurements in f; and
h. using the plurality of quality metrics in g., select at least one subchannel of at least one channel for use in radio communications.
i. Using the plurality of quality metrics in g. and the selected subchannel(s) in h., select the transmission characteristics to be employed in radio communications on each selected subchannel.

As will be appreciated by those skilled in the art, the channel is understood to be a contiguous portion of the RF spectrum, such as could be designated by a center frequency and a bandwidth. A subchannel is understood to be a portion of a channel, which can be contiguous or non-contiguous and may or may not coincide with the entire channel.

For example, the received signal strength measurements in e. or one or more of the statistical characteristics in f, or both, are obtained from the use of a channel selection method such as ALE. The spectral estimation process in b includes a spectrum compensation process. The channel selection method is the ALE method defined by the US military standard MIL-STD-188-141 or the NATO standard STANAG 4538.

In some embodiments, information as to the quantity of traffic arriving for delivery within the system, such as a backlog or arrival rate, which can be either measured, estimated, or specified, is used in the subchannel selection process of h., or the transmission parameter selection process of i., or both. Information as to the Quality of Service required or desired by traffic arriving for delivery within the system is used in the subchannel selection process of h., or the transmission parameter selection process of i., or both.

Information concerning potential spectrum occupancy or interference sources from a source external to the system (such as a database of known spectrum users or interference sources and the frequencies they occupy) is used in the subchannel selection process of h., or the transmission parameter selection process of i., or both. For example, the wireless RF transceiver is configured to operate in an HF range and with a channel width greater than 3 kHz.

Another aspect is directed to a communications system comprising two or more of the communications devices described hereinabove, organized into at least one wireless communications network. In this communications system, one or more of the following:
  aa. the plurality of metrics representing noise and interference power as described in c. above;
  bb. the one or more statistical characteristic(s) of the noise and interference power metrics described in d. above;
  cc. the plurality of received signal strength measurements described in e. above;
  dd. the one or more statistical characteristics of the plurality of received signal strength measurements described in f. above;
is/are shared between a station at which these items are collected and calculated and at least one other station in the communications system, in order to make the subchannel selection process in h. above more effective, or the selection of transmission parameters in i. above more effective, or both.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications device comprising:
a wireless radio frequency (RF) transceiver; and
a controller coupled to said wireless RF transceiver and configured to
determine a plurality of received signal characteristics and perform a spectral estimation operation associated with a frequency spectrum on the plurality of received signal characteristics,
determine a channel selection method characteristic associated with a channel in the frequency spectrum comprising a plurality of channels,
generate a plurality of statistical values for each channel based upon the plurality of received signal characteristics, and
select a portion of the frequency spectrum for a signal to be transmitted by said wireless RF transceiver based upon the spectral estimation operation, the plurality of statistical values, and the channel selection method characteristic.

2. The communications device of claim 1 wherein said controller is configured to generate a quality metric value for each possible portion of the spectrum for the signal to be transmitted; and wherein said controller selects the portion of the spectrum further based upon the quality metric values.

3. The communications device of claim 1 wherein said controller is configured to select the portion of the spectrum further based upon at least one received signal strength characteristic.

4. The communications device of claim 1 wherein said controller is configured to select the portion of the spectrum further based upon the plurality of statistical values.

5. The communications device of claim 1 wherein said controller is configured to generate a signal-to-noise value profile for each channel based upon the plurality of statistical values.

6. The communications device of claim 1 wherein said controller is configured to perform spectrum compensation on results of the spectral estimation operation.

7. The communications device of claim 1 wherein the plurality of received signal characteristics comprises a plurality of received sample values.

8. The communications device of claim 1 wherein said wireless RF transceiver is configured to operate in a high frequency (HF) range and with a channel width greater than 3 kHz.

9. The communications device of claim 1 wherein said controller is configured to select the portion of the spectrum based upon a cognitive radio process.

10. The communications device of claim 1 wherein said controller is configured to determine the plurality of received signal characteristics and the channel selection method characteristic, and perform the spectrum estimation method simultaneously.

11. A communications device comprising:
a wireless radio frequency (RF) transceiver configured to operate in a high frequency (HF) range and with a channel width greater than 3 kHz; and
a controller coupled to said wireless RF transceiver and configured to
determine a plurality of received signal characteristics and perform a spectral estimation operation associated with a frequency spectrum on the plurality of received signal characteristics,
determine a channel selection method characteristic associated with a channel in the frequency spectrum comprising a plurality of channels,
generate a plurality of statistical values for each channel based upon the plurality of received signal characteristics, and
select a portion of the frequency spectrum for a signal to be transmitted by said wireless RF transceiver based upon the spectral estimation operation, the channel selection method characteristic, the plurality of statistical values, and at least one received signal strength characteristic.

12. The communications device of claim 11 wherein said controller is configured to generate a quality metric value for each possible portion of the spectrum for the signal to be transmitted; and wherein said controller selects the portion of the spectrum further based upon the quality metric values.

13. The communications device of claim 11 wherein said controller is configured to select the portion of the spectrum further based upon the plurality of statistical values.

14. The communications device of claim 11 wherein said controller is configured to generate a signal-to-noise value profile for each channel based upon the plurality of statistical values.

15. The communications device of claim 11 wherein said controller is configured to perform spectrum compensation on results of the spectral estimation operation.

16. A communications device comprising:
a wireless radio frequency (RF) transceiver; and
a controller coupled to said wireless RF transceiver and configured to
determine a plurality of received signal characteristics for a signal received in each channel of a plurality of channels,
perform a spectral estimation operation for each channel using the plurality of received signal characteristics,
determine a plurality of first metric values representing a power of noise and interference value for the received signal in each channel on which spectral estimation has been performed,
determine at least one first statistical characteristic based upon the plurality of first metric values for the at least one channel,
determine a plurality of received signal strength measurements of the received signal in each channel based upon a known signal,
determine at least one second statistical characteristic based upon the plurality of received signal strength measurements,
determine a plurality of second quality metrics for a portion of the at least one channel using the at least one first statistical characteristic and the at least one second statistical characteristic,
using the plurality of second quality metrics, select at least one portion of at least one channel for use in radio communications, and
using the plurality of second quality metrics and the selected at least one channel, select at least one transmission characteristic to be used in the radio communications on at least one selected portion of at least one channel.

17. The communications device of claim 16 wherein said controller is configured to obtain the plurality of received signal strength measurements and the at least one second statistical characteristic from an Automatic Link Establishment (ALE) channel selection method.

18. The communications device of claim 17 wherein the ALE channel selection method is based upon at least one of MIL-STD-188-141 and NATO standard STANAG 4538.

19. The communications device of claim 16 wherein said controller is configured to perform the spectral estimation operation including a spectrum compensation process.

20. The communications device of claim 16 wherein said controller is configured to select the at least one portion of at least one channel for use in the radio communications using at least one traffic metric.

21. The communications device of claim 16 wherein said controller is configured to select the at least one portion of at least one channel for use in the radio communications using a desired Quality of Service (QoS) for traffic.

22. The communications device of claim 16 wherein said controller is configured to select the at least one portion of at least one channel for use in the radio communications using at least one of potential spectrum occupancy information and interference information from a source comprising a database.

23. The communications device of claim 16 wherein said wireless RF transceiver is configured to operate in a high frequency (HF) range and with a channel width greater than 3 kHz.

24. A wireless communication system comprising:
a plurality of communications devices communicating with each other, each communications device comprising a wireless radio frequency (RF) transceiver, and a controller coupled to said wireless RF transceiver and configured to
determine a plurality of received signal characteristics for a signal received in each channel of a plurality of channels,
perform a spectral estimation operation for each channel using the plurality of received signal characteristics,
determine a plurality of first metric values representing a power of noise and interference value for the received signal in each channel on which spectral estimation has been performed,
determine at least one first statistical characteristic based upon the plurality of first metric values for the at least one channel,
determine a plurality of received signal strength measurements of the received signal in each channel based upon a known signal,
determine at least one second statistical characteristic based upon the plurality of received signal strength measurements,
determine a plurality of second quality metrics for a portion of the at least one channel using the at least one first statistical characteristic and the at least one second statistical characteristic,
using the plurality of second quality metrics, select at least one portion of at least one channel for use in radio communications, and
using the plurality of second quality metrics and the selected at least one portion of at least one channel, select at least one transmission characteristic to be used in the radio communications on the selected at least one portion of at least one channel.

25. The wireless communication system of claim 24 wherein said controller of each communications device is configured to share at least one of the plurality of first metric values, the at least one first statistical characteristic, the plurality of received signal strength measurements, and the at least one second statistical characteristic with other communications devices.

26. The wireless communication system of claim 24 wherein said controller of each communications device is configured to select the at least one portion of at least one channel for use in radio communications based upon the shared data received from other communications.

27. A method of operating a communications device including a wireless radio frequency (RF) transceiver, and a controller coupled thereto, the method comprising:
using the controller to determine a plurality of received signal characteristics and perform a spectral estimation operation associated with a frequency spectrum on the plurality of received signal characteristics, the frequency spectrum comprising a plurality of channels;
using the controller to generate a plurality of statistical values for each channel based upon the plurality of received signal characteristics;
using the controller to determine a channel selection method characteristic associated with a channel in the frequency spectrum; and
using the controller to select a portion of the frequency spectrum for a signal to be transmitted by the wireless RF transceiver of the communications device based upon the spectral estimation operation, the plurality of statistical values, and the channel selection method characteristic.

28. The method of claim 27 further comprising using the controller to generate a quality metric value for each possible portion of the spectrum for the signal to be transmitted; and wherein selecting the portion of the spectrum is further based upon the quality metric values.

29. The method of claim 27 wherein selecting the portion of the spectrum is further based upon at least one received signal strength characteristic.

30. The method of claim 27 wherein selecting the portion of the spectrum is further based upon the plurality of statistical values.

31. The method of claim 27 further comprising using the controller to generate a signal-to-noise value profile for each channel based upon the plurality of statistical values.

32. The method of claim 27 further comprising using the controller to perform spectrum compensation on results of the spectral estimation operation.

33. The method of claim 27 further comprising operating the wireless RF transceiver in a high frequency (HF) range and with a channel width greater than 3 kHz.

* * * * *